United States Patent
Lee et al.

(10) Patent No.: US 8,594,027 B2
(45) Date of Patent: Nov. 26, 2013

(54) APPARATUS AND METHOD FOR PEER-TO-PEER (P2P) COMMUNICATIONS IN A BROADBAND WIRELESS COMMUNICATION SYSTEM

(75) Inventors: Sang-Min Lee, Seoul (KR); Young-Ho Jung, Suwon-si (KR); Myeon-Kyun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1259 days.

(21) Appl. No.: 12/163,830

(22) Filed: Jun. 27, 2008

(65) Prior Publication Data

US 2009/0005057 A1 Jan. 1, 2009

(30) Foreign Application Priority Data

Jun. 29, 2007 (KR) ........................ 10-2007-0065215

(51) Int. Cl.
 *H04B 7/14* (2006.01)
 *H04B 7/212* (2006.01)
 *H04J 1/10* (2006.01)
 *H04J 3/08* (2006.01)
 *H04W 4/00* (2009.01)

(52) U.S. Cl.
 USPC ........... 370/329; 370/315; 370/327; 370/328; 370/338; 370/348

(58) Field of Classification Search
 None
 See application file for complete search history.

(56) References Cited

U.S. PATENT DOCUMENTS

| 7,734,292 B2* | 6/2010 | Cho et al. ...................... 455/436 |
| 2004/0264504 A1* | 12/2004 | Jin ................................ 370/469 |
| 2005/0135284 A1* | 6/2005 | Nanda et al. .................. 370/294 |
| 2006/0168343 A1* | 7/2006 | Ma et al. ....................... 709/245 |
| 2007/0211686 A1* | 9/2007 | Belcea et al. ................. 370/345 |
| 2009/0201860 A1* | 8/2009 | Sherman et al. .............. 370/329 |
| 2009/0232234 A1* | 9/2009 | Du ................................ 375/260 |

FOREIGN PATENT DOCUMENTS

CN 1574833 A 2/2005

OTHER PUBLICATIONS

Tommy Svensson et al., IST-4-027756, Winner II, D4.6.1 Version 1.0, The Winner II Air Interface: Refined multiple access concepts, Information Society Technologies, Nov. 30, 2006.
Mikael Sternad et al., Winner MAC for Cellular Transmission in Proc. IST Mobile Summit, Jun. 2006.
Hung-Yun Hsieh et al., On Using Peer-to-Peer Communication in Cellular Wireless Data Network, Mobile Computing, IEEE Transactions on vol. 3, Issue 1, Jan.-Feb. 2004 pp. 57-72.
Mikael Sternad et al., The Winner B3G System MAC Concept, Vehicular Technology Conference, 2006, VTC-2006 Fall, 2006 IEEE 64th Sep. 25-28, 2006, pp. 1-5.
"The Winner II Air Interface: Refined multiple access concepts", Tommy Svensson et al., Information Society Technologies, Nov. 30, 2006.

* cited by examiner

*Primary Examiner* — Faruk Hamza
*Assistant Examiner* — Diane Lo
(74) *Attorney, Agent, or Firm* — Jefferson IP Law, LLP

(57) ABSTRACT

An apparatus and method for supporting Peer-to-Peer (P2P) communications in a broadband wireless communication system are provided. A frame used by the terminal in P2P communications includes a plurality of P2P contention channels overlapping with a region for cellular communications and at least one P2P dedicated channel allocated by a base station only for the P2P communications. The method includes establishing a P2P connection with a correspondent terminal through the at least one P2P dedicated channel, and exchanging P2P communication data with the correspondent terminal through at least one of the plurality of P2P contention channels.

34 Claims, 9 Drawing Sheets

APPARATUS AND METHOD FOR PEER-TO-PEER (P2P) COMMUNICATIONS IN A BROADBAND WIRELESS COMMUNICATION SYSTEM

PRIORITY

This application claims the benefit under 35 U.S.C. §119 (a) of a Korean patent application filed in the Korean Intellectual Property Office on Jun. 29, 2007 and assigned Serial No. 2007-65215, the entire disclosure of which is hereby incorporated by reference.

BACKGROUND OF THE INVENTION

1. Field of the Invention

The present invention relates to a broadband wireless communication system. More particularly, the present invention relates to an apparatus and a method for Peer-to-Peer (P2P) communications in the broadband wireless communication system.

2. Description of the Related Art

In a cellular communication system, a terminal typically communicates directly with a base station using radio resources managed by the base station. To communicate with each other, two terminals each need to establish a connection to the base station and to be assigned UpLink (UL) and DownLink (DL) radio resources from the base station. The base station forwards data received from one terminal through the corresponding connection to another terminal through a separate connection.

Peer-to-Peer (P2P) is a communication scheme for use between two terminals. P2P enables the communications by establishing a direct connection between the two terminals. The two terminals directly transmit and receive signals. An example of a wireless communication system supporting P2P includes a Wireless world INitiative NEw Radio (WINNER) of the Wireless World Initiative (WWI).

A conventional frame structure of the WINNER system is shown in FIG. 1. The frame of the WINNER system is constituted as a super frame. One super frame includes a control signal region 110, a plurality of DL regions 120, a plurality of UL regions 130, and a P2P region 140. The P2P region 140 is a resource region allocated for the P2P communications between the terminals. Accordingly, the P2P region 140 is not used for the communications between the base station and the terminal. Thus, the terminals can conduct the P2P communications without the intervention of the base station.

However, as the resource region for the P2P communications is separately allocated, traffic resources used by the base station are reduced. This reduction degrades the performance of the cellular system. This is the reason why providers of cellular wireless communication systems avoid P2P communications using the separate resource region. Even when a provider supports P2P communications using the separate resource region, cellular communication fees are likely to increase to offset the loss of capacity resulting from P2P communications. Therefore, what is needed is a method for performing P2P communications by minimizing the loss of the radio resources used for cellular communications.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for minimizing a loss of radio resources used for cellular communications and for performing a P2P communication in a broadband wireless communication system.

Another aspect of the present invention is to provide an apparatus and a method for performing P2P communications using a frame structure overlapping with a cellular communication frame in a broadband wireless communication system.

Yet another aspect of the present invention is to provide an apparatus and a method for performing P2P communications using a contention based channel in a broadband wireless communication system.

Still another aspect of the present invention is to provide an apparatus and a method for setting a P2P connection using a P2P dedicated protocol message in a broadband wireless communication system.

The above aspects are addressed by providing an operating method of a terminal for P2P communications in a broadband wireless communication system. The method includes establishing a P2P connection with a correspondent terminal through at least one P2P dedicated channel, and exchanging P2P communication data with the correspondent terminal through at least one of a plurality of P2P contention channels. The terminal performs P2P communication according to a frame which comprises the plurality of P2P contention channels overlapping with a region for cellular communications and the at least one P2P dedicated channel allocated by a base station only for P2P communications.

According to one aspect of the present invention, an operating method of a terminal for P2P communications in a broadband wireless communication system is provided. The method includes establishing a P2P connection with a correspondent terminal for P2P communications using one or more P2P protocol messages, and exchanging P2P communication data with the correspondent terminal through at least one of a plurality of P2P contention channels.

According to another aspect of the present invention, a terminal for P2P communications in a broadband wireless communication system is provided. The terminal includes a controller for establishing a P2P connection with a correspondent terminal through at least one P2P dedicated channel, and a communicator for exchanging P2P communication data with the correspondent terminal through at least one of a plurality of P2P contention channels. The terminal performs P2P communication according to a frame which comprises a plurality of P2P contention channels overlapping with a region for cellular communications and the at least one P2P dedicated channel allocated by a base station only for P2P communications.

According to yet another aspect of the present invention, a terminal for P2P communications in a broadband wireless communication system is provided. The terminal includes a controller for establishing a P2P connection with a correspondent terminal of P2P communications using one or more P2P protocol messages, and a communicator for exchanging P2P communication data with the correspondent terminal through at least one of a plurality of P2P contention channels.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for supporting Peer-to-Peer (P2P) communications in a broadband wireless communication system. Hereinafter, a wireless communication system using a Time Division Duplex (TDD) scheme is illustrated by way of example. Note that exemplary embodiments of the present invention are applicable to a wireless communication system using a Frequency Division Duplex (FDD) scheme or a Hybrid Division Duplex (HDD) scheme.

More particularly, exemplary embodiments of the present invention define a physical frame structure for supporting P2P communications and P2P protocol messages, and suggest a P2P protocol message exchange procedure for terminals using the present frame structure.

Figure 1:
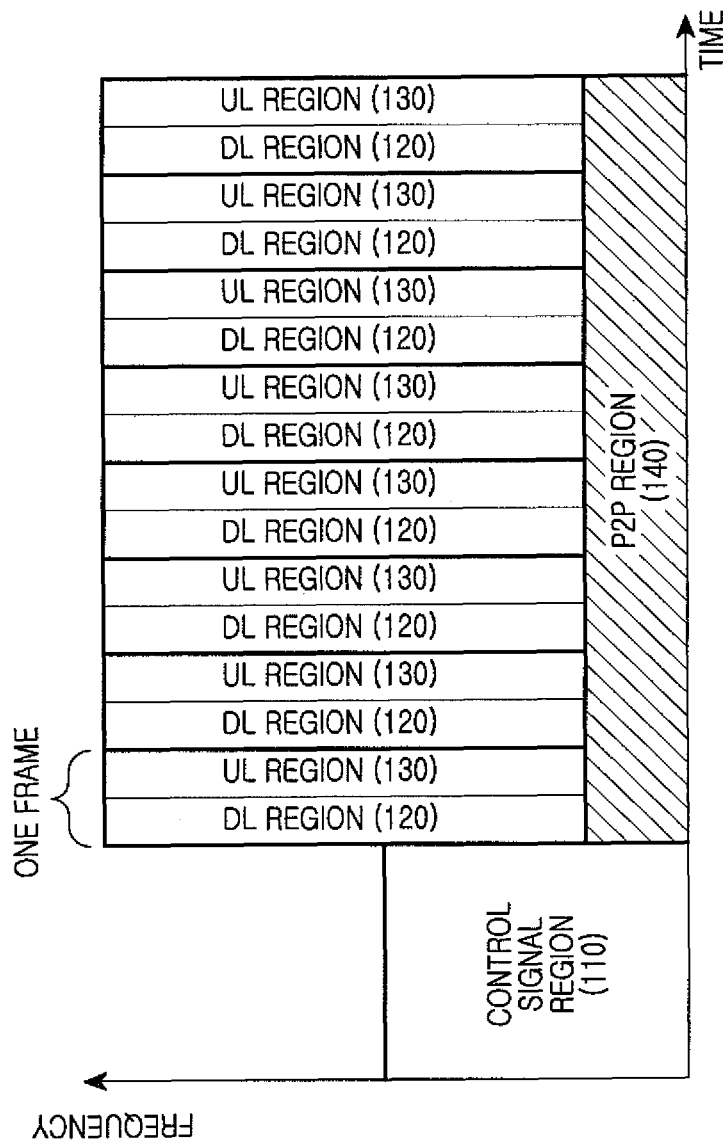
FIG. 1 illustrates a conventional frame structure of a Wireless world INitiative NEw Radio (WINNER) system.
Figure 2:
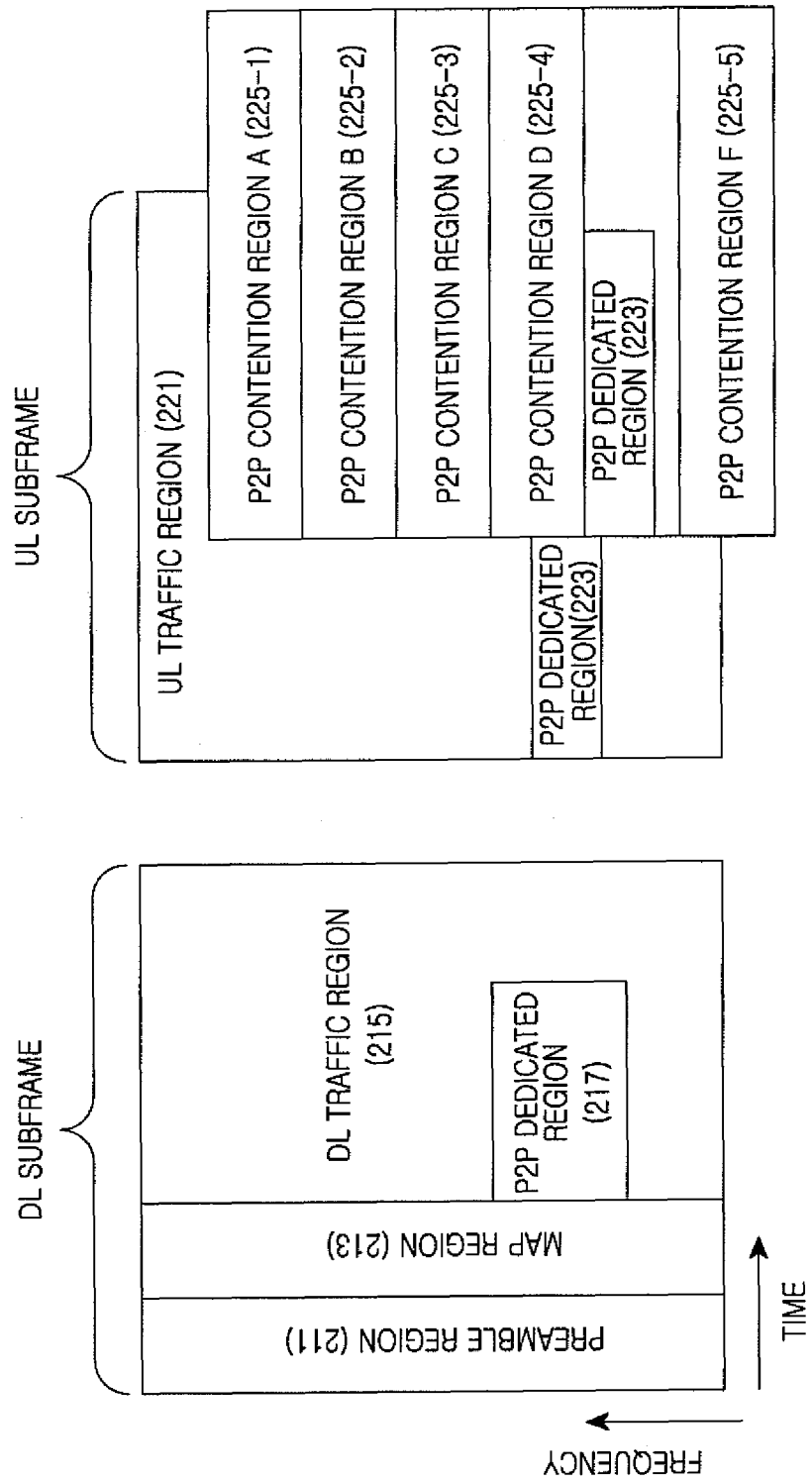
FIG. 2 illustrates a frame structure for Peer-to-Peer (P2P) communications in a broadband wireless communication system according to an exemplary embodiment of the present invention.

The physical frame structure of an exemplary embodiment of present invention is shown in FIG. 2. A DownLink (DL) subframe in FIG. 2 includes a preamble region 211, a MAP region 213, a DL traffic region 215, and a P2P dedicated region 217. An UpLink (UL) subframe includes a UL traffic region 221, a P2P dedicated region 223, and a plurality of P2P contention regions 225-1 through 225-5. The structure of the regions of the UL subframe, excluding the P2P dedicated region 223, is overlapped in both the frequency axis and the time axis. That is, in the UL subframe, radio resources, excluding radio resources occupied by the P2P dedicated region 223, are used by both of the UL traffic region 221 and the P2P contention regions 225-1 through 225-5.

The preamble region 211 carries a preamble for acquiring frame synchronization. The MAP region 213 carries a MAP message to inform the terminal of resource allocation information. Herein, the MAP message includes resource allocation information for communications between the terminal and a base station over the DL traffic region 215 and the UL traffic region 221, allocation information of the P2P dedicated region 217 of the DL subframe, and allocation information of the P2P dedicated region 223 of the UL subframe. The DL traffic region 215 carries a signal from the base station to the terminal.

The P2P dedicated regions 217 and 223 of the DL subframe and the UL subframe exchange control information between the terminals of the P2P communications. The P2P dedicated regions 217 and 223 are exclusively allocated in relation with the region for the cellular communications as shown in FIG. 2. While the P2P dedicated regions 217 and 223 are present in both the DL subframe and the UL subframe in FIG. 2, they may be provided selectively in one of the DL subframe and the UL subframe. Alternatively, the P2P dedicated regions 217 and 223 can reside inside or outside of the P2P contention regions 225-1 through 225-5. When the P2P dedicated regions 217 and 223 overlap the P2P contention regions 225-1 through 225-5, the P2P dedicated regions 217 and 223 occupy a minimum number of the P2P contention regions. That is, the P2P dedicated regions 217 and 223 are allocated to minimize the number of the unavailable P2P contention regions. The unavailable P2P contention regions due to the P2P dedicated regions 217 and 223 are informed to the terminals using the MAP message. The DL P2P dedicated region 217 may be allocated according to a MAP message of one or more previous frames. The UL P2P dedicated region 223 may be allocated according to a MAP message of the previous frame or the same frame.

Although it is not illustrated, the P2P dedicated region 217 includes a P2P control region. The P2P control region is utilized to exchanges P2P protocol messages of the control information between the terminals in P2P communications. The P2P protocol messages include a request message, a certificate message, a response message, and so on. The P2P protocol messages can selectively include a confirm message. Usages and structures of the P2P protocol messages will be described in more detail in Table 1.

The UL traffic region 221 delivers a signal from the terminal to the base station. The P2P contention regions 225-1 through 225-5 deliver a signal exchanged between the terminals in the P2P communications. The P2P contention regions 225-1 through 225-5 are distinguished from one another exclusively. The P2P contention regions 225-1 through 225-5 are superimposed with a region used for cellular communication. That is, the resources occupied by the P2P contention regions 225-1 through 225-5 are also used for P2P communications and cellular communications of the terminals. Simultaneously, the P2P contention regions 225-1 through 225-5 can be used for P2P communications of pairs of terminals that do not interfere with each other. In FIG. 2, the P2P contention regions 225-1 through 225-5 are constituted as slots in the same time length as the UL subframe time interval. By contrast, the P2P contention regions 225-1 through 225-5 can be divided to a plurality of time slots within one UL subframe. Besides the UL subframe region, the P2P contention regions 225-1 through 225-5 can further include an Industrial Scientific Medial (ISM) frequency region or a band not used for cellular communications.

The usages and the information of the P2P protocol messages are shown in Table 1.

TABLE 1

| Message type | Usage | Information |
| --- | --- | --- |
| request message (RTS) | request P2P communication connection | destination terminal<br>requested contention channel number<br>random number per contention channel<br>number of requested slots<br>communication scheme (bi-direction/uni-direction) |
| certificate message (CTS) | inform of connection setup determination | destination terminal<br>contention channel number to be used<br>number of slots to be used<br>communication scheme (bi-direction/uni-direction) |
| response message (RES) | response for certificate message | destination terminal<br>contention channel number to be used<br>number of slots to be used<br>communication scheme (bi-direction/uni-direction) |
| confirm message (CON) | inform of connection setup | destination terminal<br>contention channel number to be used<br>number of slots to be used<br>communication scheme (bi-direction/uni-direction) |

The request message is utilized to request an initial P2P communication connection and includes information relating to a destination terminal, at least one of requested contention channel number, at least one of random number per contention channel, the number of requested slots, and a communication scheme. Herein, the random number per contention channel is a parameter used to determine a priority when the same contention channel is requested by multiple terminals at the same time. The random number per contention channel has a one-to-one correspondence with the requested contention channel numbers. In other words, the terminal receiving the request message needs to select a contention channel to be used by referring to requested contention channel number. Upon receiving a plurality of request messages including the same requested contention channel number, the terminal determines the priority of the corresponding contention channels by comparing the random numbers of the corresponding contention channels. Yet, the use of the random number is a mere example. Depending on the intention of the system operator, the priority of the contention channels can be determined using other means than the random numbers. For example, a Connection IDentifier (CID) or the number of requested slot can be used. Alternatively, two or more of the CID, the number of requested slot, and the random number can be utilized in combination. When not using the random number, it is preferable that the request message does not include the random number information.

The certificate message is utilized to inform of the determination result of the terminal that receives the connection request message, and includes information relating to the destination terminal, at least one of the contention channel number to be used, the number of slots to be used, and the communication scheme. Mostly, P2P communications are performed according to parameter values of the certificate message.

The response message is a response of the terminal receiving the certificate message. The response message includes information relating to the destination terminal, at least one of the contention channel number to be used, the number of slots to be used, and the communication scheme. Mostly, parameter values of the response message are the same as those of the certificate message. Yet, when a plurality of certificate messages received from different terminals at the same time includes the same contention channel number, the terminal can give up on the contention channel selected by the correspondent terminal to avoid a collision on the contention channel. In this case, information of the certificate message differs from that of the response message.

The confirm message is used when the certificate message and the response message are different from each other. The confirm message is utilized to inform of the difference between the contention channel and the information of the certificate message. Note that there is no particular problem with the P2P communications if the confirm message is not utilized. However, the use of the confirm message can increase the likelihood of more terminals being able to engage in the P2P communication.

Of the information in the P2P protocol messages, the destination terminal parameter indicates a terminal that needs to set the P2P connection using the corresponding P2P protocol message. Since the P2P contention channel is a contention-based channel, other terminals besides the two terminals engaging in the P2P communication should be aware that the contention channel is to be occupied by the two terminals. For doing so, it is necessary to broadcast the P2P protocol message to all terminals. The terminal receiving the P2P protocol message should be aware which terminal occupies the contention channel of the received message. That is, when a terminal that is not the destination terminal receives the P2P protocol message, the P2P protocol message directs to setting of non-availability.

To ease the understanding, the request message is referred to as ReqesTS (RTS) message, the certificate message is referred to as a CerTificateS message (CTS), the response message is referred to as a RESonse message (RES), and the confirm message is referred to as a CONfirm message (CON).

Figure 3:
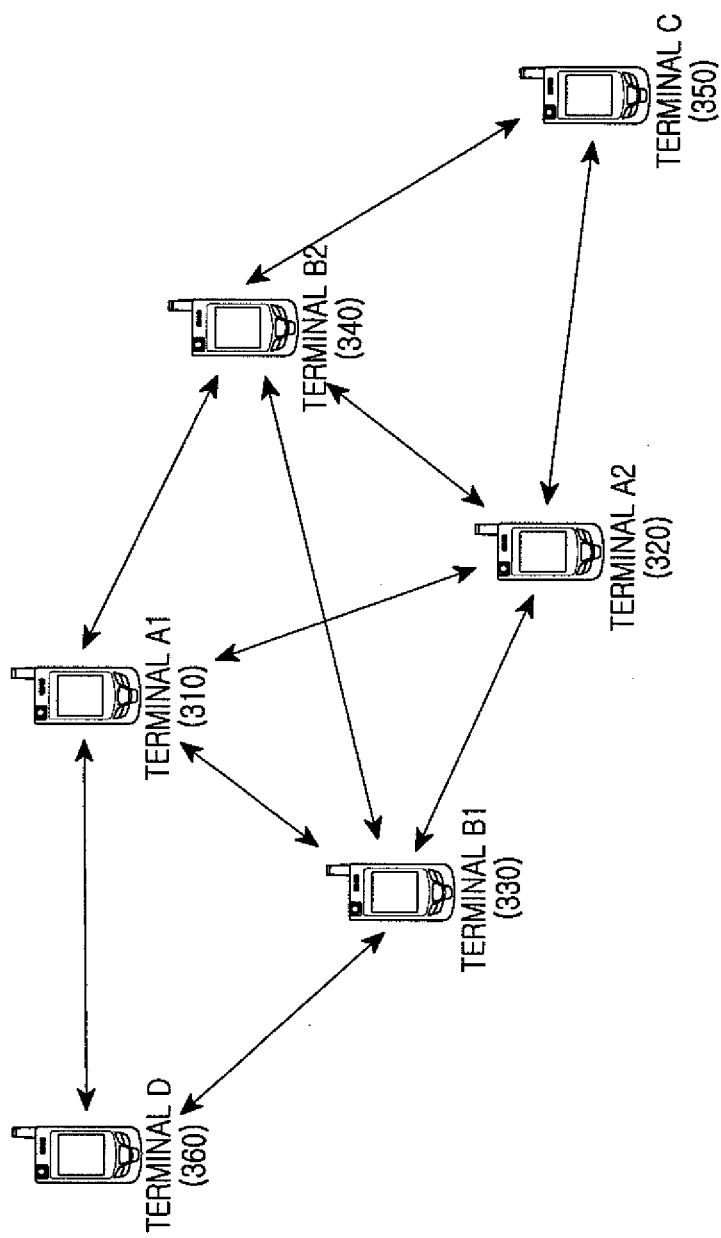
FIG. 3 illustrates positional relations between terminals.

Now, given a plurality of terminals 310 through 360 in FIG. 3, the P2P communication procedure using the frame structure and the P2P protocol messages are explained. Two terminals linked by a left-right arrow enable mutual communications. Specifically, the terminal A1 310, the terminal A2 320, the terminal B1 330, and the terminal B2 340 can communicate with each other. The terminal C 350, the terminal A2 320, and the terminal B2 340 can communicate with each other. The terminal D 360, the terminal A1 310, and the terminal B1 330 can communicate with each other.

Figure 4A:
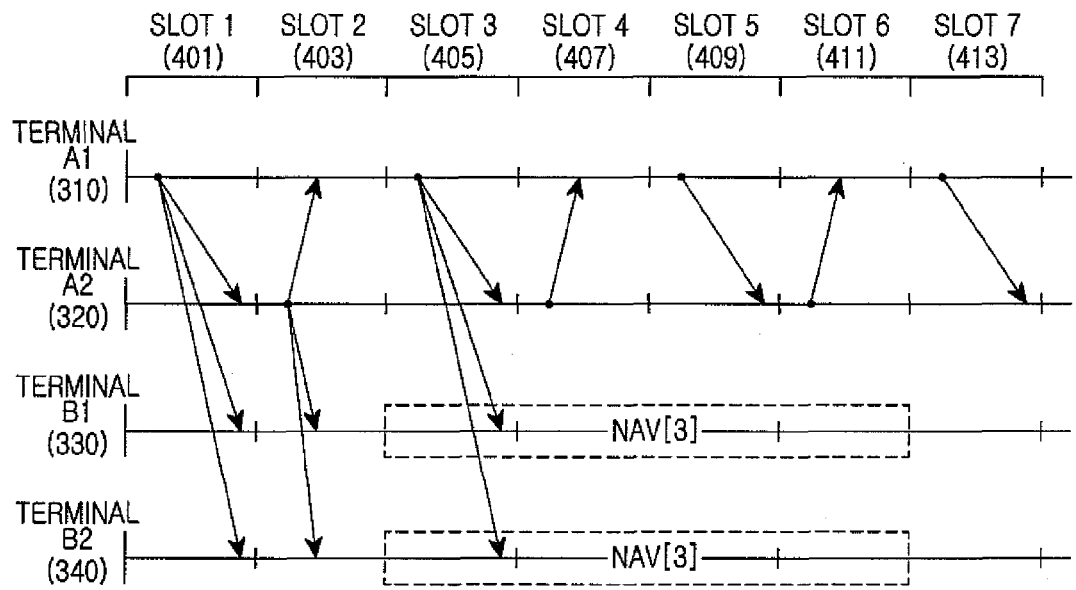
FIGS. 4A and 4B illustrate a first message exchange example in a P2P communication setup in a broadband wireless communication system according to an exemplary embodiment of the present invention.
Figure 4B:
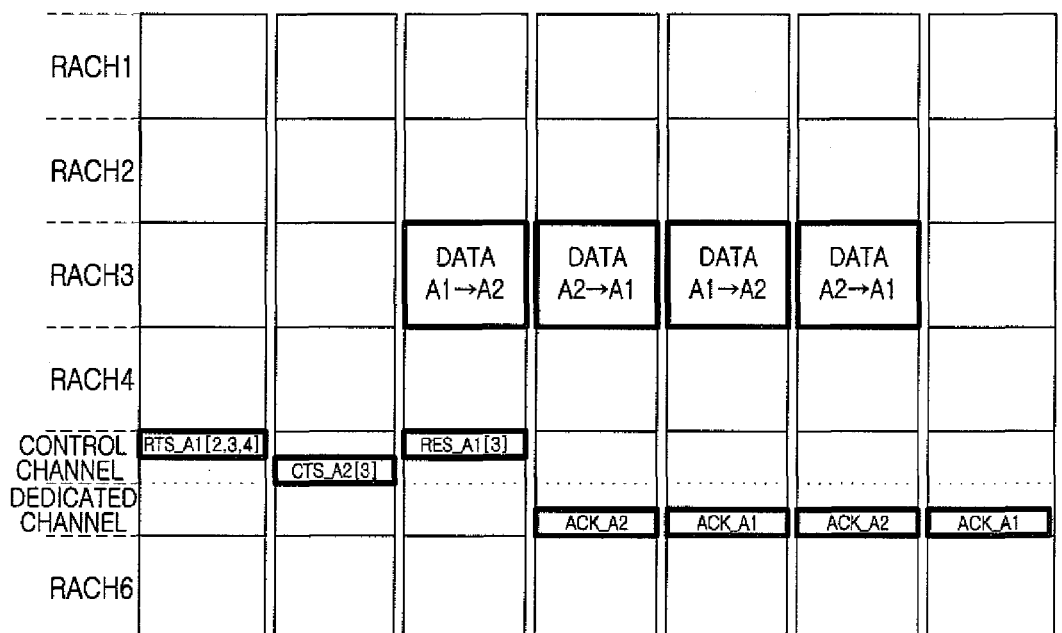

FIGS. 4A and 4B illustrate message and data exchanges for the P2P communications between the terminal A1 310 and the terminal A2 320, given a single control channel. FIG. 4A illustrates transmissions and receptions of the terminals in each slot and an available channel state. In FIG. 4A, an arrow indicates transmission and reception of the message and the data, and NAV[k] denotes non-availability of the k-th contention channel. FIG. 4B depicts a frame use of the terminals in the slots of FIG. 4A. Random Access CHannel (RACH) indicates the contention channel.

In the first slot 401, the terminal A1310 transmits an RTS in the control channel. The parameters of the RTS are shown in Table 2.

TABLE 2

| Parameters | Value |
| --- | --- |
| destination terminal | terminal A2 |
| requested contention channel number | [2, 3, 4] |
| number of requested slots | 1 |
| communication scheme | bi-direction |

The RTS is received at not only the terminal A2 320 but also the terminal B1 330 and the terminal B2 340.

In the second slot 403, the terminal A2 320 receiving the RTS confirms that it is the destination terminal of the RTS and determines P2P parameter values by taking into account its state. The terminal A2 320 transmits a CTS including the determined parameter values in the control channel. The parameters of the CTS are shown in Table 3.

TABLE 3

| Parameters | Value |
| --- | --- |
| destination terminal | terminal A1 |
| contention channel number to be used | [3] |
| number of slots to be used | 4 |
| communication scheme | di-direction |

The CTS is received at not only the terminal A1 310 but also the terminal B1 330 and the terminal B2 340. The terminal B1 330 and the terminal B2 340 recognize from the CTS that the RACH3 is occupied by the terminal A2 320 over the third through sixth slots, and sets non-availability of the RACH3 over the third through sixth slots.

In the third slot 405, the terminal A1 310 receiving the CTS transmits an RES through the control channel and transmits data through the RACH3. The parameters of the RES are the same as the parameters of the CTS.

In the fourth slot 407, the terminal A2 320 transmits ACKnowledge (ACK) for the data received in the dedicated channel and transmits data through the RACH3. In the fifth slot 409, the terminal A1310 transmits ACK for the received data in the dedicated channel and transmits data in the RACH3. In the sixth slot 411, the terminal A2 320 transmits ACK for the received data in the dedicated channel and transmits data in the RACH3. In the seventh slot 413, the terminal A1310 transmits ACK for the received data in the dedicated channel and the terminal B1 330 and the terminal B2 340 release the non-availability of the RACH3.

When there is one control channel as shown in FIGS. 4A and 4B, two P2P link establishments cannot proceed at the same time. When two different terminals transmit the RTS at the same time, the two RTSs collide with each other and thus are not successfully received. To prevent this, the system can process a plurality of P2P connection establishments at the same time by allocating a plurality of control channels. The plurality of the control channels enables the concurrent exchange of the multiple RTSs so that the terminals can rapidly establish the P2P connection.

Figure 5A:
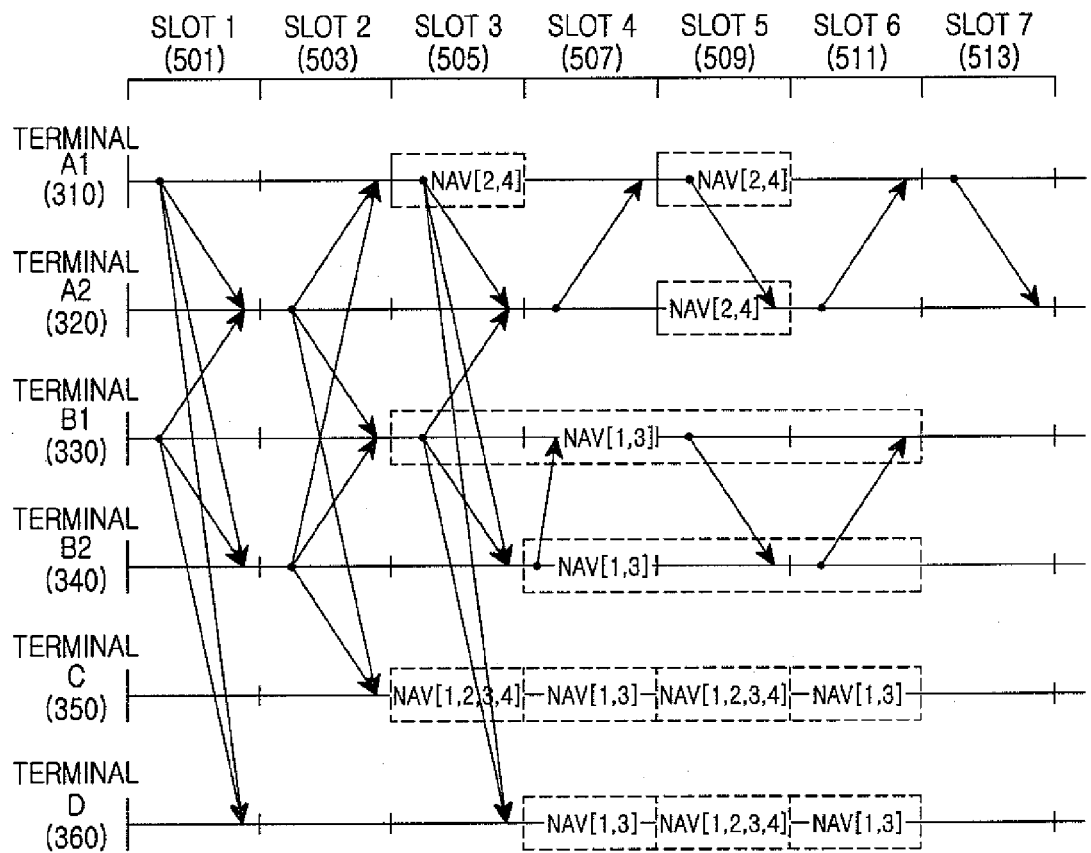
FIGS. 5A and 5B illustrate a second message exchange example in a P2P communication setup in a broadband wireless communication system according to an exemplary embodiment of the present invention.
Figure 5B:
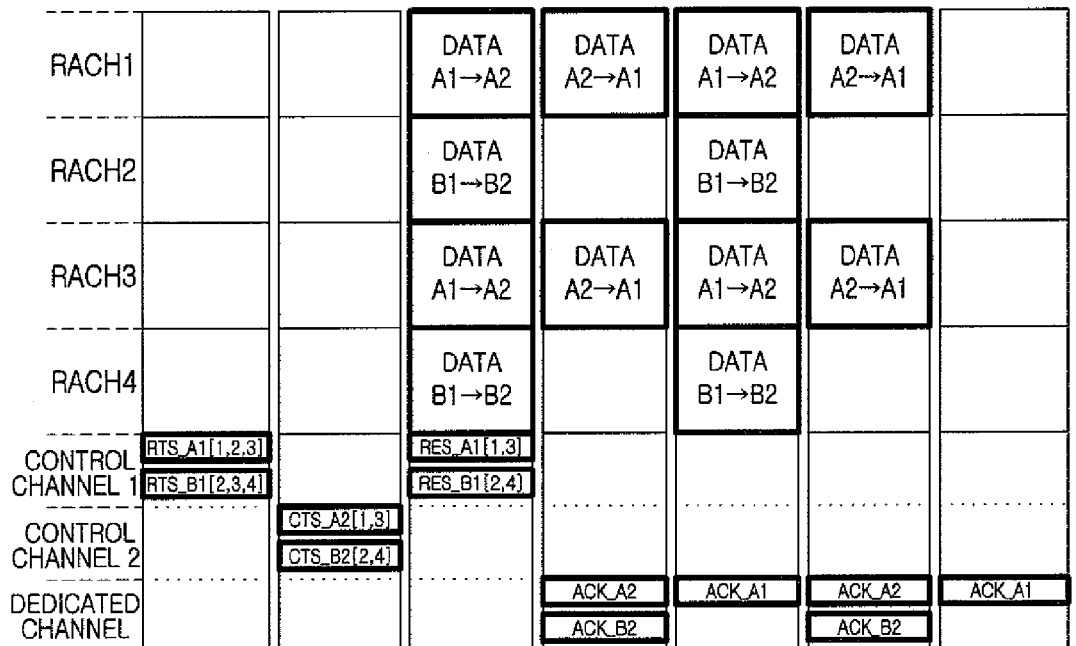

FIGS. 5A and 5B illustrate message and data exchanges for simultaneously processing the P2P connection establishment of the terminal A1 310 and the terminal A2 320 and the P2P connection establishment of the terminal B1 330 and the terminal B2 340 with two control channels. FIG. 5A illustrates transmissions and receptions and the available channel state of the terminals in each slot. In FIG. 5A, an arrow indicates the message and data transmission and reception, and NAV[k] denotes the non-availability of the k-th contention channel. FIG. 5B depicts the use of the frame of the terminals in the slots of FIG. 5A. RACH in FIG. 5B indicates the contention channel.

In the first slot 501, the terminal A1310 and the terminal B1330 transmit RTS in the first control channel at the same time. The parameters of the RTS_A1 from the terminal A1310 and the parameters of the RTS_B1 from the terminal B1 330 are shown in Table 4.

TABLE 4

| Parameters | Value | |
| --- | --- | --- |
| | RTS_A1 | RTS_B1 |
| destination terminal | terminal A2 | terminal B2 |
| requested contention channel number | [1, 2, 3] | [2, 3, 4] |
| random number | [5, 2, 8] | [4, 7, 9] |
| number of requested slots | 6 | 2 |
| communication scheme | bi-direction | uni-direction |

The RTS_A1 and the RTS_B1 are received at each of terminal A2 320, terminal B2 340, and terminal D 360.

In the second slot 503, the terminal A2 320 receiving the RTS_A1 determines P2P parameter values and transmits CTS_A2 in the second control channel. The terminal B2 340 receiving the RTS_B1 determines P2P parameter values and transmits CTS_B2 in the second control channel. As receiving both of the RTS_A1 and the RTS_B1, the terminal A2 320 and the terminal B2 340 recognize that the use requests of the RACH2 and the RACH3 overlap. Thus, the terminal A2 320 and the terminal B2 340 determine priority using the random number of the corresponding contention channel of each RTS. For example, when the rule gives the priority to a terminal of the higher random number, the priority for the RACH2 is given to the terminal B1 330 which transmits the RTS_B1 because the random number for the RACH2 is 2 in the RTS_A1 and 7 in the RTS_B1. Since the random number for the RACH3 is 8 in the RTS_A1 and 4 in the RTSB 1, the priority for the RACH3 is given to the terminal A1 330 which transmits the RTS_A1. The rule of the priority varies depending on the intention of the system operator. The priority rule can utilize not only the random number but also the CID or the number of requested slot. The parameters of the CTS_A2 and the CTS_B2 are shown in Table 5.

TABLE 5

| Parameters | Value | |
| --- | --- | --- |
| | CTS_A2 | CTS_B2 |
| destination terminal | terminal A2 | terminal B2 |
| contention channel number to be used | [1, 3] | [2, 4] |
| number of slots to be used | 4 | 2 |
| communication scheme | bi-direction | uni-direction |

The CTS_A2 and the CTS_B2 are received at the terminal A1 310, the terminal B1 330, and the terminal C 350. Upon receiving the CTS_A2, the terminal B1 330 and the terminal C 350 set the non-availability of the RACH1 and the RACH3 in the third through sixth slots. Receiving the CTS_B2, the terminal A1 310 and the terminal C 350 set the non-availability of the RACH2 and the RACH4 in the third slot and the fifth slot.

In the third slot 505, the terminal A1 310 receiving the CTS_A2 transmits RES_A1 in the first control channel and transmits data in the RACH1 and the RACH3. The terminal B1 330 receiving the CTS_B2 transmits RES_A1 in the first control channel and transmits data in the RACH2 and the RACH4. The parameters of the RES_A1 and the RES_B1 are the same as those of the CTS_A2 and the CTS_B2. The RES_A1 and the RES_B1 are received at all of the terminal A2 320, the terminal B2 340, and the terminal D 360. Thus, the terminal B2 340 and the terminal D 360, receiving the RES_A1, set the non-availability of the RACH1 and the RACH3 in the fourth, fifth, and sixth slots. The terminal A2 320 and the terminal D 360, receiving the RES_B1, set the non-availability of the RACH2 and the RACH4 in the fifth slot.

In the fourth slot 507, the terminal A2 320 transmits ACK for the received data in the dedicated channel and transmits data in the RACH1 and the RACH3. The terminal B2 340 sends ACK for the received data in the dedicated channel.

In the fifth slot 509, the terminal A1 310 sends ACK for the received data in the dedicated channel and transmits data in the RACH1 and the RACH3. The terminal B1 330 transmits data in the RACH2 and the RACH4.

In the sixth slot 511, the terminal A2 320 sends ACK for the received data in the dedicated channel and transmits data in the RACH1 and the RACH3. The terminal B2 340 sends ACK for the received data through the dedicated channel. The terminal A1 310, the terminal A2 320, the terminal C 350, and the terminal D 360 release the non-availability of the RACH2 and the RACH4.

In the seventh slot 513, the terminal A1 310 sends ACK for the received data in the dedicated channel. The terminal B1 330, the terminal B2 340, the terminal C 350, and the terminal D 360 release the non-availability of the RACH1 and the RACH3.

It is assumed that the terminal A1 310 and the terminal B2 340 cannot communicate with each other in FIGS. 5A and 5B. Since the terminal B2 340 cannot receive the RTS_A1 from the terminal A1 310 in the first slot, it does not recognize the use request collision of the RACH2 and the RACH3. Hence, in the second slot, the terminal B2 340 transmits CTS_B2 including the intended contention channel number [2, 3, 4]. Yet, as receiving not only the CTS_B2 but also the CTS_A2, the terminal B1 330 recognizes the collision of the used contention channel. To avoid the contention channel collision, the terminal B1 330 transmits RES_B1 by setting the intended contention channel number as [2, 4].

The terminal, which receives the CTS_B2 but not the RES_B1, will set the non-availability of the RACH2, the RACH 3, and the RACH4. Namely, a specific terminal is likely to unnecessarily set the non-availability of the RACH3. However, such a case is unusual and causes no error in system operations. Instead, when the available contention channel is set as non-available, some resources may be wasted. To address this problem, upon receiving the RES including the different information from its transmitted CTS, the terminal transmits CON including the same information as the RES. In other words, the terminal B2 340 can inform the neighbor terminals of the availability of the RACH3 by sending the CON_B2 including the same information as the RES_B1.

Hereafter, the structure and the operations of the terminal for the P2P communications are described in more detail by referring to the drawings.

Figure 6:
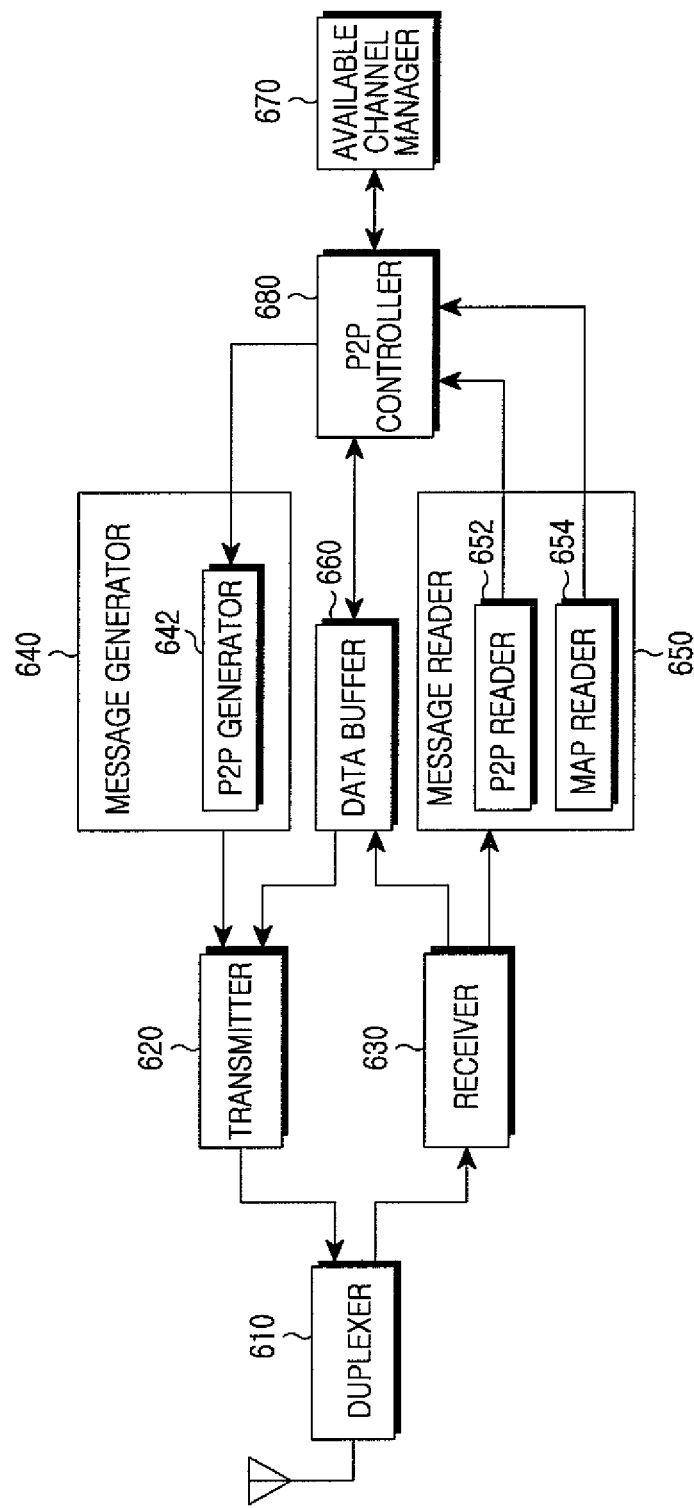
FIG. 6 illustrates a terminal in a broadband wireless communication system according to an exemplary embodiment of the present invention.

FIG. 6 is a block diagram of the terminal in a broadband wireless communication system according to an exemplary embodiment of the present invention.

The terminal of FIG. 6 includes a duplexer 610, a transmitter 620, a receiver 630, a message generator 640, a message reader 650, a data buffer 660, an available channel manager 670, and a P2P controller 680. Although it is not illustrated, the terminal may include a function block for conducting conventional cellular communications with the base station.

The duplexer 610 controls transmission and reception according to TDD, FDD, or HDD. For example, for TDD, the duplexer 610 acts like a time switch to connect the transmitter 620 to an antenna in a transmission time interval and to connect the receiver 630 to the antenna in a reception time interval.

The transmitter 620 converts bit streams output from the message generator 640 and the data buffer 660 into a signal and transmits the signal over the antenna. For example, according to an Orthogonal Frequency Division Multiplexing (OFDM) communication scheme, the transmitter 620 converts the input bit stream into complex symbols by decoding and demodulating the bit stream, generates time-axis OFDM symbols by arranging the complex symbols in the frequency axis and performing an Inverse Fast Fourier Transform (IFFT) operation, up-converts the OFDM symbols into a Radio Frequency (RF) band, amplifies the RF signal, and then transmits the signal over the antenna. In doing so, when the P2P protocol message is provided, the transmitter 620 maps and transmits the P2P protocol message to the P2P dedicated channel. When the P2P data is provided, the transmitter 620 maps and transmits the P2P data to the P2P contention channel.

The receiver 630 converts a signal received on the antenna into a bit stream. For example, according to the OFDM communication scheme, the receiver 630 down-coverts the signal received on the antenna to a baseband signal, restores complex symbols per subcarrier by performing a FFT operation on the time-axis OFDM symbol basis, and restores an information bit stream by demodulating and decoding the complex symbols. The receiver 630 classifies the message and the data and provides the classified message and data to the message reader 650 or the data buffer 660.

The message generator 640 generates a control message transmitted to control the communications. More particularly, a P2P generator 642 of the message generator 640 generates the P2P protocol messages. For example, The P2P protocol messages include the RTS, the CTS, the RES, and the CON. The information contained in the P2P protocol messages are shown in Table 1.

The message reader 650 reads the control message received for the communication control. For example, a MAP reader 654 of the message reader 650 reads a MAP message received from the base station. According to this exemplary embodiment of the present invention, the MAP reader 654 confirms allocation information of the P2P dedicated region and provides the confirmed allocation information to the P2P controller 680. A P2P reader 652 of the message reader 650 reads the P2P protocol messages. For example, the P2P protocol messages include the RTS, the CTS, the RES, and the CON. The information contained in the P2P protocol messages are shown in Table 1.

The data buffer 660 temporarily stores the data to be transmitted and the received data. The data buffer 660 stores and outputs data exchanged through the P2P communications amongst the data, under the control of the P2P controller 680. The available channel manager 670 stores and updates available P2P contention channel information under the control of the P2P controller 680.

The P2P controller 680 controls the functions for the P2P communications. For instance, the P2P controller 680 controls the P2P connection establishment, and the P2P contention channel allocation and the use. In more detail, the P2P controller 680 controls the message generation of the P2P generator 642, makes a determination and controls according to the message provided from the P2P reader 652.

For the P2P connection request, the functions of the blocks of FIG. 6 are now explained. The P2P controller 680 determines P2P parameter values and generates a random backoff variable. The P2P controller 680 determines whether or not a number of P2P slots have passed, wherein the number is substantially the same as the random backoff variable, and controls the P2P generator 642 to generate an RTS including the determined P2P parameter values. The P2P generator 642 generates and provides the RTS to the transmitter 620 over the n-th slot. The receiver 630 receives a CTS from the correspondent terminal over the (n+1)-th slot and provides the received CTS to the P2P reader 652. The P2P reader 652 reads the CTS and provides the P2P parameter values to the P2P controller 680. The P2P controller 680 controls the P2P generator 642 to generate an RES. The P2P generator 642 generates and provides the RES to the transmitter 620 in the (n+2)-th slot. In doing so, a plurality of the CTSs can be received and the contention channel number can overlap among the CTSs. In this respect, the P2P controller 680 controls the P2P generator 642 not to include the overlapping contention channel number in the RES. After the RES is transmitted, the P2P controller 680 controls to execute the P2P communications according to the parameters of the RES.

Now, the functions of the blocks are described in a case where the P2P connection is accepted. The receiver 630 receives an RTS from the correspondent terminal in the n-th slot and provides the received RTS to the P2P reader 652. The P2P reader 652 reads and provides the RTS to the P2P controller 680. The P2P controller 680 determines P2P parameter values by taking into account the information in the RTS, the available channel information, and its status. In doing so, a plurality of the RTSs can be received and the contention channel number can overlap in the RTSs. In this situation, the P2P controller 680 determines the priority of the corresponding contention channels according to a given rule by comparing the random numbers corresponding to the overlapping contention channel number. If the correspondent terminal cannot acquire the occupation priority of the corresponding contention channel, the P2P controller 680 controls the available channel manager 670 to set the non-availability of the corresponding contention channel. After determining the P2P parameter values, the P2P controller 680 controls the P2P generator 642 to generate a CTS. The P2P generator 642 generates and provides the CTS to the transmitter 620 over the (n+1)-th slot. Next, the receiver 630 receives an RES in the (n+2)-th slot and provides the RES to the P2P reader 652. The P2P reader 652 reads and provides the RES to the P2P controller 680. The P2P controller 680 controls to execute the P2P communications according to the parameter values of the RES. The P2P controller 680 determines whether the parameter values of the CTS are the same as those of the RES. When the parameter values are different, the P2P controller 680 controls the P2P generator 642 to generate a CON. The P2P generator 642 generates and provides the CON to the transmitter 620 over the (n+3)-th slot.

In addition to the control for the P2P communication request and acceptance, the P2P controller 680 updates an available channel list managed by the available channel manager 670 by executing a P2P protocol message determination function. More specifically, when receiving the P2P protocol message, the P2P controller 680 first determines whether it is the destination terminal of the P2P protocol message. When it is not the destination terminal, the P2P controller 680 sets the non-availability of the contention channel corresponding to the contention channel number of the P2P protocol message. Notably, when the P2P protocol message is the RTS, the P2P controller 680 ignores the RTS.

Figure 7:
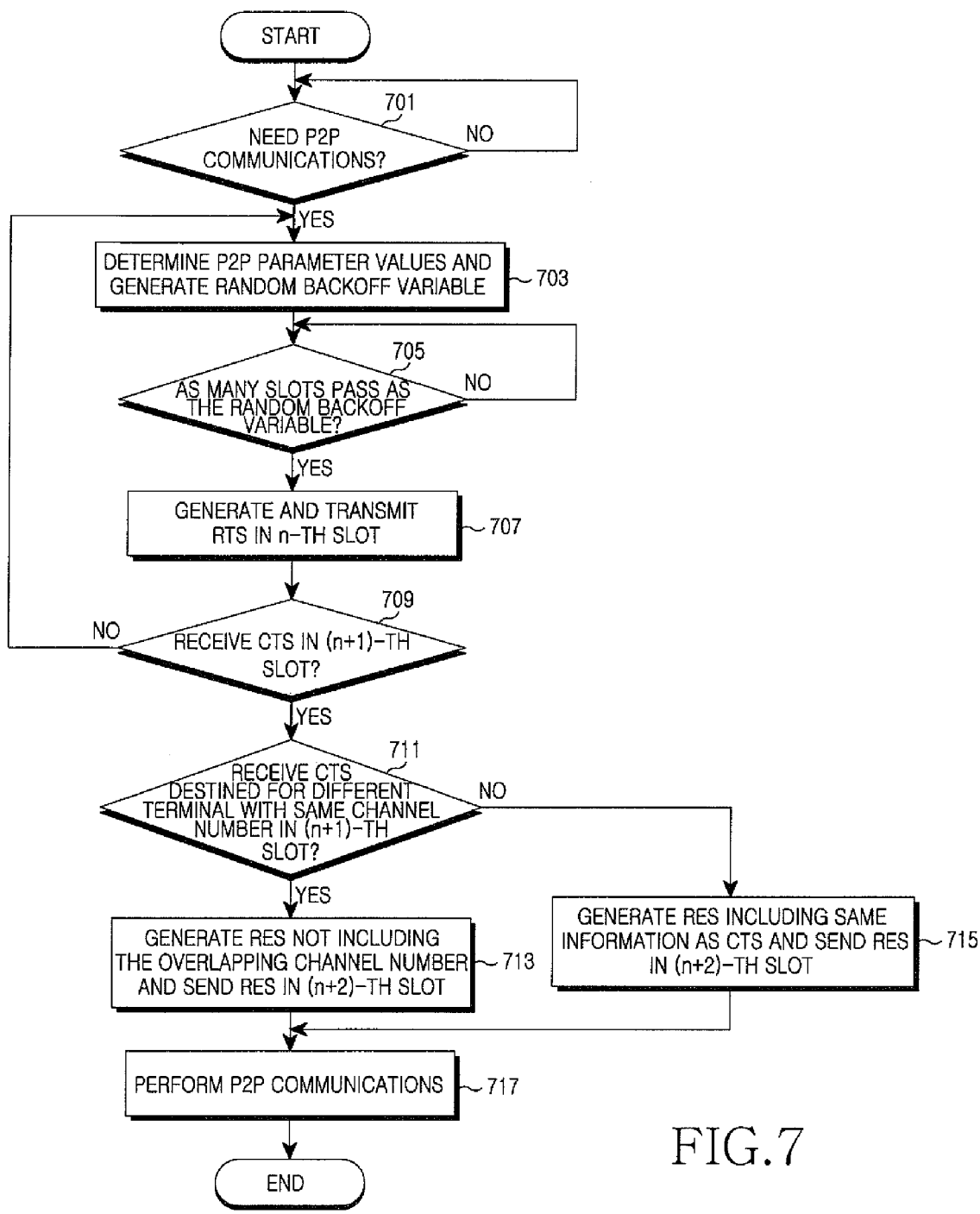
FIG. 7 illustrates a P2P connection request method of a terminal in a broadband wireless communication system according to an exemplary embodiment of the present invention.

FIG. 7 is a flowchart illustrating a P2P connection request method of a terminal in the broadband wireless communication system according to an exemplary embodiment of the present invention.

In step 701, the terminal determines whether P2P communications are necessary. The necessity of the P2P communication is instructed from an upper layer, and the P2P communication request is originated from a manipulation of the user or from an automatic control of the terminal.

After determining the necessity of the P2P communication, the terminal determines the P2P parameter values and generates the random backoff variable in step 703. Herein, the P2P parameter values are the information contained in the RTS, which relate to the destination terminal, the intended contention channel number, the random number per contention channel, the number of the intended slots, and the communication scheme.

In step 705, the terminal determines whether or not a number of P2P slots have passed, wherein the number is substantially the same as the random backoff variable. That is, the terminal stands by until as many P2P slots lapse as the random backoff variable.

When the P2P slots corresponding to the random backoff variable lapse, the terminal generates the RTS including the P2P parameter values determined in step 703 and transmits the RTS in the n-th slot through the P2P dedicated channel in step 707. The allocation information of the P2P dedicated channel is confirmed from the MAP message received from the base station.

In step 709, the terminal determines whether the CTS is received from the correspondent terminal in the (n+1)-th slot through the P2P dedicated channel. When not receiving the CTS, the terminal returns to step 703.

Upon receiving the CTS, the terminal determines whether another CTS destined for a different terminal with the same contention channel number is received in the (n+1)-th slot in step 711. More specifically, when receiving a plurality of CTSs in the (n+1)-th slot, the terminal determines whether there is one or more of the same contention channel numbers between the contention channel numbers of the CTS destined for itself and the contention channel numbers of the CTS destined for a different terminal.

When the multiple CTSs are received and the overlapping contention channel number exists, the terminal generates the RES not including the overlapping contention channel number and transmits the RES in the (n+2)-th slot through the P2P dedicated channel in step 713. The RES includes the same parameter values as the CTS, excluding the parameter value of the contention channel number.

In contrast, when the terminal only receives a CTS destined for itself or when multiple CTSs are received and there is no overlapping contention channel number, the terminal generates the RES including the same information as the CTS and transmits the RES in the (n+2)-th slot through the P2P dedicated channel in step 715.

In step 717, the terminal performs P2P communications with the correspondent terminal according to the parameter values of the RES. In other words, the terminal exchanges data with the correspondent terminal in the P2P contention channel according to the parameter values of the RES.

Figure 8:
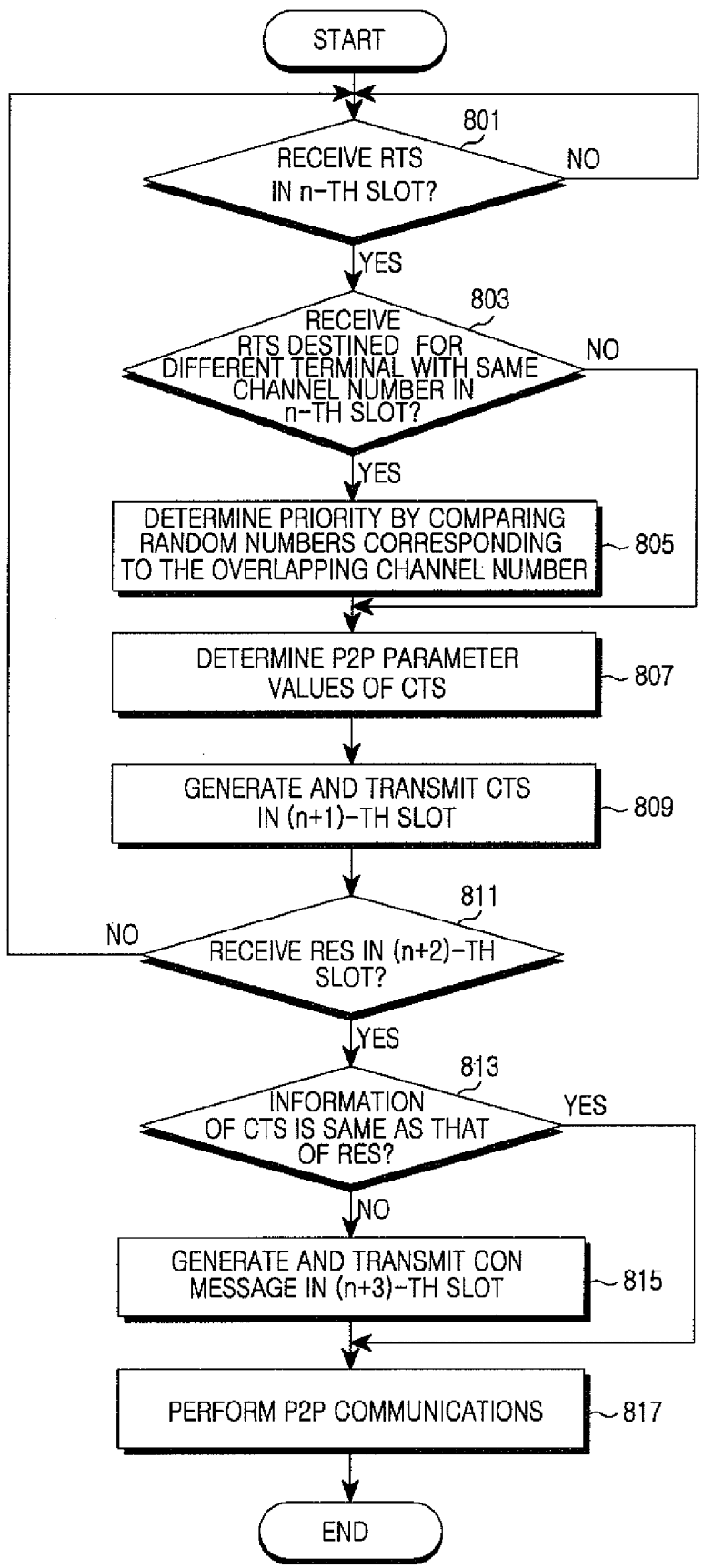
FIG. 8 illustrates a P2P connection acceptance method of a terminal in a broadband wireless communication system according to an exemplary embodiment of the present invention.

FIG. 8 is a flowchart illustrating a P2P connection acceptance method of the terminal in a broadband wireless communication system according to an exemplary embodiment of the present invention.

In step 801, the terminal determines whether it receives an RTS destined for itself in the n-th slot through the P2P dedicated channel. That is, the terminal determines whether the P2P connection is requested with it. Herein, the allocation information of the P2P dedicated channel is acquired from the MAP message received from the base station.

Upon receiving the RTS, the terminal determines whether another RTS destined for a different terminal with the same contention channel number is received in the n-th slot in step 803. When receiving the multiple RTSs in the n-th slot, the terminal determines whether there are one or more identical contention channel numbers between the RTS destined for it and the RTS destined for a different terminal.

When only the RTS destined for itself is received or when the multiple RTSs are received and there is no overlapping contention channel number, the terminal goes to step 807.

In contrast, when the multiple RTSs are received and the overlapping contention channel number is detected, the terminal determines priority according to a given rule by comparing the random numbers corresponding to the overlapping contention channel number in step 805. For example, the terminal can give the occupation priority of the corresponding contention channel to a terminal having the highest random number. In doing so, when the correspondent terminal fulls to get the priority, the terminal sets the non-availability of the contention channel corresponding to the overlapping contention channel number.

In step 807, the terminal determines P2P parameter values of the CTS by taking into account the information of the RTS, the available channel information, and its status. The P2P parameter values include the destination terminal, the intended contention channel number, the number of the intended slots, and the communication scheme.

In step 809, the terminal generates the CTS including the P2P parameter values determined in step 807 and transmits the CTS in the (n+1)-th slot through the P2P dedicated channel.

In step 811, the terminal determines whether an RES is received from the correspondent terminal in the (n+2)-th slot through the P2P dedicated channel. When the RES is not received, the terminal returns to step 801.

When the RES is received, in step 813, the terminal determines whether the information of the RES is the same as the information of the CTS transmitted in step 809. That is, the terminal determines whether the parameter values of the RES are the same as those of the CTS.

When there are one or more different parameter values in the RES and the CTS, the terminal generates a CON including the same information as the information of the RES and transmits the CON in the (n+3)-th slot through the dedicated channel in step 815.

In step 817, the terminal performs P2P communications with the correspondent terminal according to the parameter values of the RES. Namely, the terminal exchanges data with the correspondent terminal according to the parameter values of the RES through the P2P contention channel.

In FIGS. 7 and 8, the terminal exchanges the P2P protocol messages with the correspondent terminal and then proceeds with the establishment of the P2P connection. Since the P2P contention channel is a contention-based channel, the terminal needs to manage the available channel information by determining an irrelevant P2P protocol message, that is, a P2P protocol message received from a different terminal other than the correspondent terminal. For doing so, the terminal receives every P2P protocol message through the P2P control channel and examines the received messages. Specifically, in FIGS. 7 and 8, the terminal examines the message upon every reception of the RTS, the CTS, or the RES, and proceeds to the next operation when it is the destination terminal. The terminal examines the P2P protocol message as shown in FIG. 9.

Figure 9:
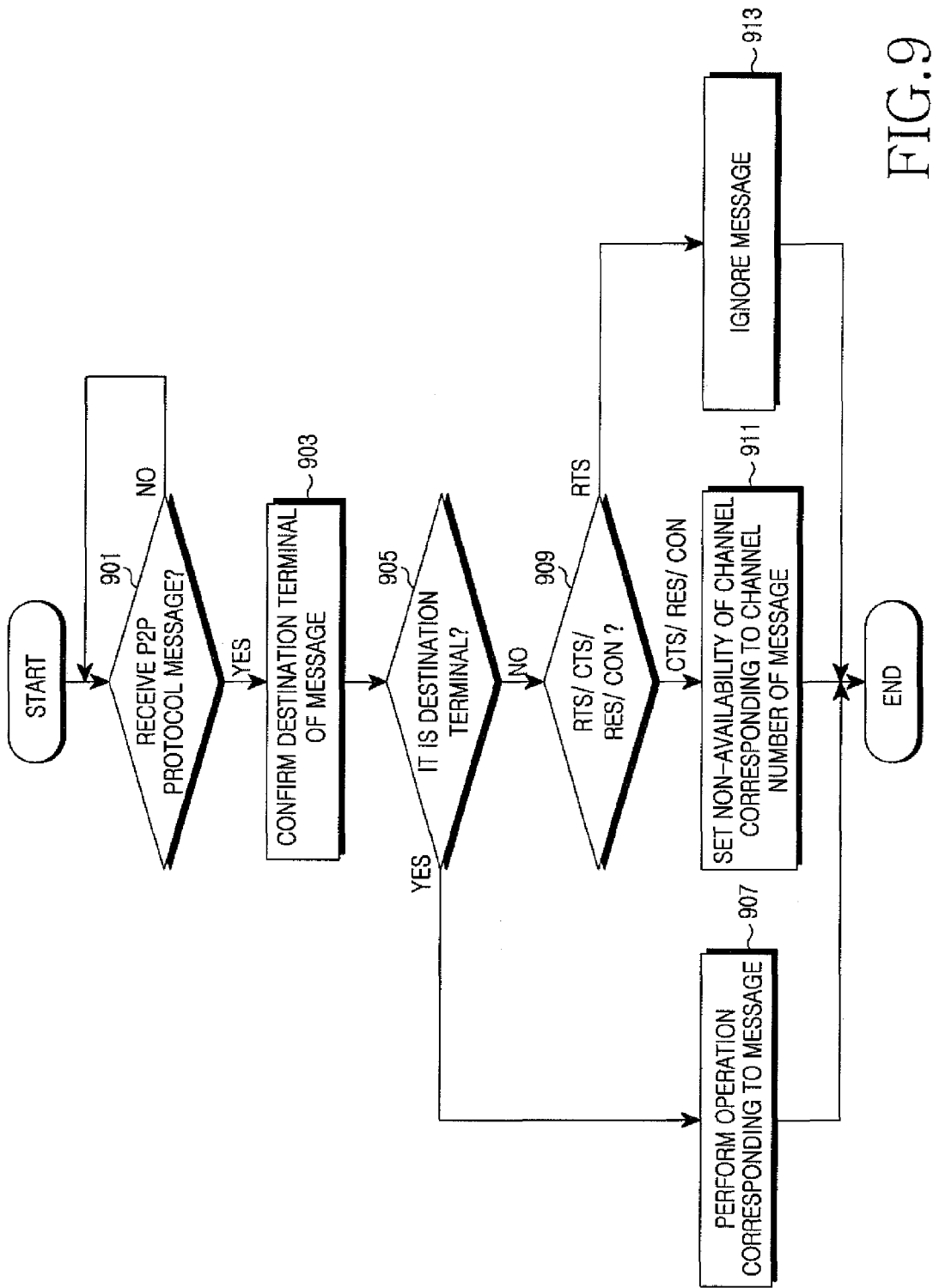
FIG. 9 illustrates a P2P protocol message examining method of a terminal in a broadband wireless communication system according to an exemplary embodiment of the present invention.

FIG. 9 is a flowchart illustrating a P2P protocol message examining method of a terminal in a broadband wireless communication system according to an exemplary embodiment of the present invention.

In step 901, the terminal determines whether a P2P protocol message is received or not. The P2P protocol message is received through the P2P control channel. The allocation information of the P2P control channel is acquired from the MAP message received from the base station.

When receiving the P2P protocol message, the terminal confirms the destination terminal of the P2P protocol message in step 903.

In step 905, the terminal determines whether it is the destination terminal. That is, the terminal determines whether the P2P protocol message is received from its correspondent terminal.

When the terminal is the destination terminal, the terminal performs the operation corresponding to the received P2P protocol message in step 907. For instance, when the P2P protocol message is the RTS, the terminal determines the P2P parameter values based on the available channel list. When the P2P protocol message is the CTS, the terminal generates and transmits the RES message. When the P2P protocol message is the RES, the terminal performs the P2P communications.

In contrast, when the terminal is not the destination terminal, the terminal determines the type of the P2P protocol message in step 909. That is, the terminal determines whether the P2P protocol message is which one of the RTS, the CTS, the RES, and the CON.

When the P2P protocol message is the CTS, the RES, or the CON, the terminal sets the non-availability of the contention channel corresponding to the contention channel number of the P2P protocol message in step 911.

When the P2P protocol message is the RTS, the terminal ignores the P2P protocol message in step 913.

As set forth above, for P2P communications in the broadband wireless communication system, the physical frame of the overlapping structure and the P2P protocol messages are defined and the P2P communications is carried out using the physical structure and the messages. Therefore, the P2P communications can be accomplished by minimizing the loss of the radio resources used for the cellular communications.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a first terminal to perform Peer-to-Peer (P2P) communications with a second terminal in a wireless communication system, the method comprising:
    performing a signaling to establish a P2P connection with the second terminal and transmitting or receiving P2P communication data with the second terminal through at least one P2P dedicated channel and at least one of P2P contention channels,
    wherein the first terminal performs a P2P communication with the second terminal according to a frame which comprises the P2P contention channels overlapping with at least a part of a region for cellular communications and
    wherein the at least one P2P dedicated channel is allocated by a base station only for P2P communications, and the P2P contention channels are contention-based channels to be used between terminals for the P2P communications,
    wherein the P2P communication establishes a direct connection between the two terminals.

2. The method of claim 1, wherein the at least one P2P dedicated channel comprises a region for signaling to establish the P2P connection, and
    wherein the P2P contention channels comprise a region for transmitting or receiving P2P communication data.

3. The method of claim 1, wherein the at least one P2P dedicated channel is positioned in at least one of a downlink subframe for the cellular communications and an uplink subframe for the cellular communications.

4. The method of claim 3, further comprising receiving a MAP message from a base station; and
    confirming resource allocation information for the at least one P2P dedicated channel based on the MAP message.

5. The method of claim 4, wherein when the at least one P2P dedicated channel is positioned in the downlink subframe for the cellular communications,
    confirming resource allocation information for the at least one P2P dedicated channel based on the MAP message comprises confirming resource allocation information for the at least one P2P dedicated channel positioned in a subsequent downlink subframe after the uplink frame.

6. The method of claim 4, wherein when the at least one P2P dedicated channel is positioned in the uplink subframe for the cellular communications
    confirming resource allocation information for the at least one P2P dedicated channel based on the MAP message comprises confirming resource allocation information for the at least one P2P dedicated channel positioned in the uplink frame.

7. The method of claim 1, wherein, when the at least one P2P dedicated channel is positioned in a same time axis as the P2P contention channels, the at least one P2P dedicated channel is allocated to minimize a number of P2P contention channels that are unavailable because of the at least one P2P dedicated channel.

8. The method of claim 1, wherein the P2P contention channels are usable at the same time for both the cellular communications and a plurality of P2P communications.

9. The method of claim 1, wherein the P2P contention channels comprise at least one of an uplink subframe region for the cellular communications, an Industrial Scientific Medical (ISM) frequency region, and a frequency region not used for the cellular communications.

10. The method of claim 1, wherein the P2P contention channels are divided into a plurality of time slots in one uplink subframe region for the cellular communications.

11. The method of claim 1, wherein the performing of the signaling to establish the P2P connection comprises, transmitting or receiving one or more P2P protocol messages that are at least one of a request message for requesting P2P communications, a certificate message for informing of a certificate of the request message, a response message for responding to the certificate message, and a confirm message for confirming setup information, and
    the request message, the certificate message, the response message and the confirm message comprise at least one parameter relating to at least one of a destination terminal, a contention channel number, a random number per contention channel, a number of slots, and bi-direction/uni-direction information.

12. The method of claim 11, wherein the performing of the signaling to establish the P2P connection comprises:
    transmitting the request message to a correspondent terminal to request P2P communications;
    determining whether the certificate message is received from the correspondent terminal; and
    transmitting the response message to the correspondent terminal.

13. The method of claim 11, wherein the performing of the signaling to establish the P2P connection comprises:
    when receiving the request message from a correspondent terminal, transmitting the certificate message to the correspondent terminal;
    determining whether the response message is received from the correspondent terminal; and
    establishing the P2P connection according to parameter values of the response message.

14. The method of claim 13, wherein the performing of the signaling to establish the P2P connection comprises:
    when receiving a plurality of request messages having an overlapping channel number from the correspondent terminal and other terminals in the same slot, determining a priority of the channel use according to a given rule; and
    when the priority is not given to the correspondent terminal, transmitting the certificate message not including the overlapping channel number.

15. The method of claim 14, wherein the priority is determined using at least one of random numbers of the terminals corresponding to the overlapping channel number, Connection IDentifiers (CIDs) of the terminals, and a request slot number.

16. The method of claim 15, wherein the priority is higher as the random numbers of the terminals are higher.

17. The method of claim 11, further comprising:
    when receiving the certificate message, the response message, or the confirm message of which the first terminal is not the destination terminal, setting non-availability of a channel corresponding to a channel number of the certificate message, the response message, or the confirm message.

18. An apparatus for operating a first terminal to perform Peer-to-Peer (P2P) communications with a second terminal in a wireless communication system, the apparatus comprising:
    a controller for performing a signaling to establish a P2P connection with the second terminal and transmitting or receiving P2P communication data with the second terminal through at least one P2P dedicated channel and at least one of P2P contention channels, wherein the first terminal performs a P2P communication with the second terminal according to a frame which comprises the P2P contention channels overlapping with at least a part of a region for cellular communications and wherein the at least one P2P dedicated channel is allocated by a base station only for P2P communications, and the P2P contention channels are contention-based channels to be used between terminals for the P2P communications, wherein the P2P communication establishes a direct connection between the two terminals.

19. The apparatus of claim 18, wherein the at least one P2P dedicated channel comprises a region for signaling to establish the P2P connection, and wherein the P2P contention channels comprise a region for transmitting or receiving P2P communication data.

20. The apparatus of claim 18, wherein the at least one P2P dedicated channel is positioned in at least one of a downlink subframe for the cellular communications and an uplink subframe for the cellular communications.

21. The apparatus of claim 20, further comprising a receiver for receiving a MAP message from a base station, the controller confirms resource allocation information for the at least one P2P dedicated channel based on the MAP message.

22. The apparatus of claim 21, wherein when the at least one P2P dedicated channel is positioned in the downlink subframe for the cellular communications, the controller confirms resource allocation information for the at least one P2P dedicated channel based on the MAP message as resource allocation information for the at least one P2P dedicated channel positioned in a subsequent downlink subframe after the uplink frame.

23. The apparatus of claim 21, wherein when the at least one P2P dedicated channel is positioned in the uplink subframe for the cellular communications, the controller confirms resource allocation information for the at least one P2P dedicated channel based on the MAP message as resource allocation information for the at least one P2P dedicated channel positioned in the uplink frame.

24. The apparatus of claim 18, wherein, when the at least one P2P dedicated channel is positioned in a same time axis as the P2P contention channels, the at least one P2P dedicated channel is allocated to minimize a number of P2P contention channels that are unavailable because of the at least one P2P dedicated channel.

25. The apparatus of claim 18, wherein the P2P contention channels are usable at the same time for both the cellular communications and a plurality of P2P communications.

26. The apparatus of claim 18, wherein the P2P contention channels comprise at least one of an uplink subframe region for the cellular communications, an Industrial Scientific Medical (ISM) frequency region, and a frequency region not used for the cellular communications.

27. The apparatus of claim 18, wherein the P2P contention channels are divided to a plurality of time slots into one uplink subframe region for the cellular communications.

28. The apparatus of claim 18, wherein the controller, to establish the P2P connection, transmits or receives one or more P2P protocol messages that are at least one of a request message for requesting P2P communications, a certificate message for informing of a certificate of the request message, a response message for responding to the certificate message, and a confirm message for confirming setup information, and the request message, the certificate message, the response message and the confirm message comprise at least one parameter relating to a destination terminal, a contention channel number, a random number per contention channel, a number of slots, and bi-direction/uni-direction information.

29. The apparatus of claim 28, wherein the controller transmits the request message to a correspondent terminal to request P2P communications, determines whether the certificate message is received from the correspondent terminal, and controls to transmit the response message to the correspondent terminal.

30. The apparatus of claim 28, wherein the controller, when receiving the request message from a correspondent terminal, controls to transmit the certificate message to the correspondent terminal, determines whether the response message is received from the correspondent terminal, and establishes the P2P connection according to parameter values of the response message.

31. The apparatus of claim 30, wherein the controller, when receiving a plurality of request messages having an overlapping channel number from the correspondent terminal and other terminals in the same slot, determines a priority of the channel use according to a given rule; and when the priority is not given to the correspondent terminal, transmits the certificate message not including the overlapping channel number.

32. The apparatus of claim 31, wherein the priority is determined using at least one of random numbers of the terminals corresponding to the overlapping channel number, Connection IDentifiers (CIDs) of the terminals, and a request slot number.

33. The apparatus of claim 32, wherein the priority is higher as the random numbers of the terminals are higher.

34. The apparatus of claim 28, wherein the controller, when receiving the certificate message, the response message, or the confirm message of which the first terminal is not the destination terminal, sets non-availability of a channel corresponding to a channel number of the certificate message, the response message, or the confirm message.

* * * * *